(12) United States Patent
Fromentoux et al.

(10) Patent No.: US 11,272,027 B2
(45) Date of Patent: Mar. 8, 2022

(54) METHOD FOR RECOMMENDING A COMMUNICATION STACK

(71) Applicant: ORANGE, Issy-les-Moulineaux (FR)

(72) Inventors: Gael Fromentoux, Chatillon (FR); Frederic Fieau, Chatillon (FR); Arnaud Braud, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 91 days.

(21) Appl. No.: 16/497,201

(22) PCT Filed: Mar. 22, 2018

(86) PCT No.: PCT/FR2018/050698
§ 371 (c)(1),
(2) Date: Sep. 24, 2019

(87) PCT Pub. No.: WO2018/172707
PCT Pub. Date: Sep. 27, 2018

(65) Prior Publication Data
US 2020/0099766 A1 Mar. 26, 2020

(30) Foreign Application Priority Data

Mar. 24, 2017 (FR) ...................................... 1752498

(51) Int. Cl.
*H04L 29/08* (2006.01)
*H04L 67/568* (2022.01)
(Continued)

(52) U.S. Cl.
CPC ...... *H04L 67/2842* (2013.01); *H04L 65/1003* (2013.01); *H04L 67/2814* (2013.01); *H04L 69/329* (2013.01)

(58) Field of Classification Search
CPC ............ H04L 67/2842; H04L 65/1003; H04L 69/329; H04L 67/2814; H04L 69/08;
(Continued)

(56) References Cited

U.S. PATENT DOCUMENTS 9,369,487 B2 * 6/2016 Bergman ............... H04L 63/168
2004/0133643 A1 * 7/2004 Warren .................... H04L 69/08
709/206

(Continued)

FOREIGN PATENT DOCUMENTS

EP 1432213 A1 6/2004

OTHER PUBLICATIONS

International Search Report dated Jun. 19, 2018 for corresponding International Application No. PCT/FR2018/050698, filed Mar. 22, 2018.

(Continued)

*Primary Examiner* — Jung Liu
(74) *Attorney, Agent, or Firm* — David D. Brush; Westman, Champlin & Koehler, P.A.

(57) ABSTRACT

A method for recommending a communication stack formed of communication protocols, relating to a data session between a terminal and a first server to provide content in a network including a second server responsible for providing the content by delegation from the first server, the first server having detected incompatibility of the stack used by the terminal and having transmitted a redirection message including information relating to a recommendation of the stack to be used to obtain the content to the terminal. In the method, the second server receives, from the terminal, an acquisition request message; selects a stack to be recommended based on data relating to the communication network or to the received acquisition request message; transmits, to the terminal, a recommendation message including (Continued)

Figure 1:
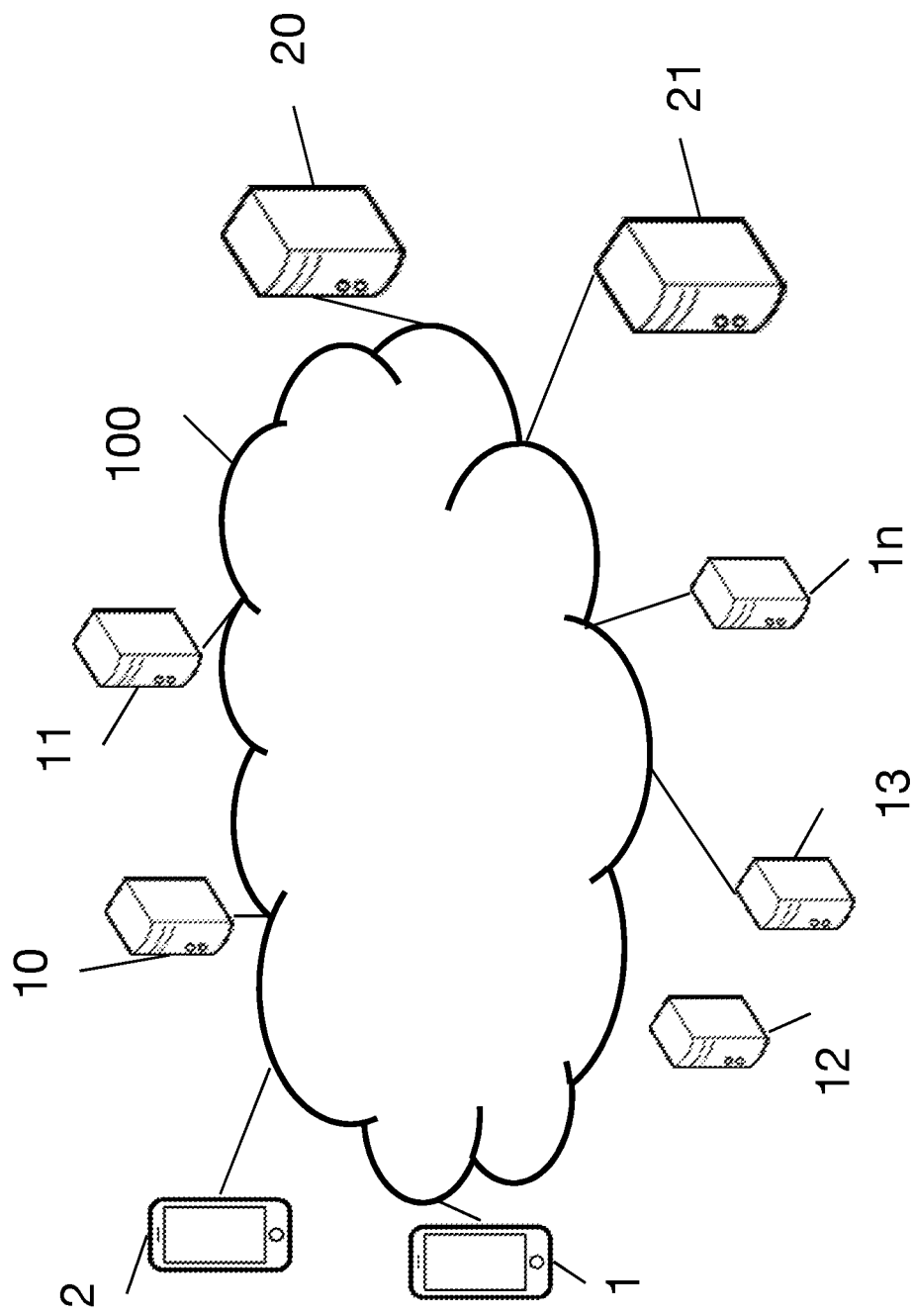

the recommended stack; and receives a message transmitted by the terminal, using the recommended stack, relating to the acquisition of the item of content.

14 Claims, 7 Drawing Sheets

(51) Int. Cl.
*H04L 65/10* (2022.01)
*H04L 67/563* (2022.01)
*H04L 69/329* (2022.01)

(58) Field of Classification Search
CPC . H04L 69/18; H04L 67/2819; H04L 67/2823; H04L 69/24; H04L 69/326; H04L 61/251; H04L 61/6068; H04L 69/167; H04L 67/146; H04L 67/02; H04L 43/50; H04L 67/10

See application file for complete search history.

(56) References Cited

U.S. PATENT DOCUMENTS

| | | | |
|---|---|---|---|
| 2010/0003928 A1 | 1/2010 | Tang et al. | |
| 2014/0095592 A1* | 4/2014 | Hartrick | H04L 47/767 |
| | | | 709/203 |
| 2016/0234188 A1* | 8/2016 | Guan | H04L 63/08 |
| 2017/0104837 A1* | 4/2017 | Lyon | H04L 43/50 |
| 2018/0007176 A1* | 1/2018 | Suthar | H04L 61/2007 |
| 2021/0007023 A1* | 1/2021 | Umapathy | H04W 36/0083 |

OTHER PUBLICATIONS

English translation of the International Written Opinion dated Jun. 26, 2018 for corresponding International Application No. PCT/FR2018/050698, filed Mar. 22, 2018.

Nottingham et al., "HTTP Alternative Services", Internet Engineering Task Force (IETF), ISSN: 2070-1721, Apr. 2016.

* cited by examiner

METHOD FOR RECOMMENDING A COMMUNICATION STACK

CROSS-REFERENCE TO RELATED APPLICATIONS

This Application is a Section 371 National Stage Application of International Application No. PCT/FR2018/050698, filed Mar. 22, 2018, which is incorporated by reference in its entirety and published as WO 2018/172707 A1 on Sep. 27, 2018, not in English.

FIELD OF THE INVENTION

The application for invention lies in the field of TCP/IP communication networks.

PRIOR ART

The protocols used by a terminal to communicate over IP (Internet Protocol) networks have become highly diversified in recent years after a period where few alterations were to be noted. The stack of protocols, corresponding to the various communication protocols used at each layer (physical, link, network, transport, session, presentation, application), can vary from one communication to another. The development of the securing of exchanges also has the consequence of a greater variety of these protocols knowing that secure versions of the hitherto-used protocols have been developed. These new protocols are often proposed by providers of contents, likewise providers of terminals and/or of operating systems, that can more easily introduce new protocols as they have control over both the client terminal and the content servers. The development of new protocols by content providers is proving itself all the more since it entails protocols which intervene from the transport layer and up to the application layer, that is to say in order to ensure end-to-end communication. Aside from the historical protocols, namely HTTP (HyperText Transfer Protocol) over TCP (Transport Control Protocol) (or UDP (User Datagram Protocol)) over IP (Internet Protocol), transport layer encryption protocols, namely TLS (Transport Layer Security) or DTLS (Datagram Transport Layer Security) can be used. At the application level, it is henceforth possible to use the HTTP/2 protocol and it is also possible to use the QUIC (Quick UDP Internet connections) protocol as transport protocol. These are just a few examples of the new protocols used by terminal nodes to communicate over IP networks and this list could be supplemented with other protocols currently under definition or used on test networks in particular. This variety of protocols is furthermore accompanied by a variety of versions. For one and the same protocol, several versions usually exist, and the diversity of the protocol stacks is therefore enriched by the diversity of protocols on the one hand and by the variety of versions of one and the same protocol on the other hand. This protocol richness of the communications between end nodes, though it deals with the needs of security, speed, richness of information, introduces on the other hand a complexity into the management of the intermediate equipment in charge of routing the traffic and also of identifying, analyzing and optimizing the communications. Operators in charge of the management of the intermediate equipment are increasingly confronted with situations where services, in particular those related to location and resolution of incidents, are degraded or indeed interrupted because of these alterations of protocols. A communication between two end nodes may differ greatly as a function of the node, of the service used, of the instant at which the communication is established and the operators in charge of conveying the communications must adapt to this context. The negotiations of the protocols used in the various protocol layers are not standardized and though it remains possible for the operator to identify the protocols used, it is not possible for him to intervene in the selecting of these protocols. However, the choosing of the protocols by the end nodes impacts the services implemented by the operators of the networks conveying the data of the communications established between the end nodes. A means exists for the end nodes to negotiate a protocol, in particular via the HTTP protocol and the "alternative services" options specified in the IETF document RFC 7838 ("HTTP alternative services"). This protocol is however insufficient since on the one hand it is based on the HTTP protocol, thus limiting its interest, and on the other hand, it makes it possible to negotiate only one protocol but not a set of protocols used for the various layers of the protocol stack. Furthermore, this means does not allow an intermediate item of equipment such as a CDN server or a cache, for example of the operator, to be able to propose new protocols to the end entities. Therefore, for servers in charge of the effective provision of contents to terminals, this solution does not make it possible to intervene on the protocol stacks of a communication between two end nodes.

One of the aims of the invention is to remedy these drawbacks of the prior art.

DISCLOSURE OF THE INVENTION

The invention seeks to improve the situation with the aid of a method for recommending a communication stack composed of a plurality of communication protocols, which relates to a data session initiated between a terminal and a first server for the provision of a content in a communications network comprising a second server in charge of the provision of the content by delegation of the first server, the first server having detected an incompatibility of the stack used by the terminal with a communication parameter of the second server and having sent the terminal a redirection message comprising an information item relating to a recommendation of the stack to be used to obtain the content, the method being implemented by the second server and comprising:
  a step of receiving from the terminal a message requesting obtainment of the content,
  a step of selecting a stack to be recommended as a function of a data item relating to the communication network or to the obtainment request message received,
  a step of sending the terminal a recommendation message comprising the recommended stack,
  a step of receiving a message transmitted by the terminal by using the recommended stack and relating to the obtainment of the content.

The contents requested by users are usually hosted and accessible via servers of CDN (Content Delivery Networks) type or cache servers. These servers are known and invoked by clients subsequent to a redirection message sent by a server identified for example in a server of DNS (Domain Name Server) type. A terminal, in communication networks, rarely obtains a content directly from a first initially invoked server but more often from a second server acting under delegation of the first server. This delegation corresponds to an agreement established between the first server and the second server to arrange for the contents to be available in proximity to the users so as to consume fewer resources (bandwidth between equipment and occupancy of the equipment). A content for which a terminal invokes a first server must be understood in a broad sense and can comprise audio content, video content, text or images but it may also comprise a program in particular in the context of "Web Services" or else an API (Application Programming Interface) program.

The information item in respect of accessibility of the second server, through this delegation, is transmitted to the terminal of the client so that the latter invokes it to obtain the desired content. Knowing that there exists a strong heterogeneity of the infrastructures and in particular of the communication protocols used by the various servers and the terminals of the clients, it is advantageous to inform the terminal about the communication protocols to be used to communicate with a given server to which it will be redirected. The first server having an agreement with the second server can thus inform the terminal of a client about the necessity to change one or more communication protocols that the terminal has used initially to communicate with the first server. This information item is transmitted to the terminal when the first server detects that the communication stack used is not compliant with a communication parameter of the second server in charge of the effective provision of the content which the terminal wishes to access.

On receipt of this message originating from the first server, in addition to the information item about the accessibility of the second server represented by an IP (Internet Protocol) address or an information item of FQDN (Fully Qualified Domain Name) type, the terminal obtains an information item about the need to change one or more communication protocols for the session established or to be established with the second server. The terminal transmits a content obtainment request to the second server identified on the basis of the accessibility information item received. When the second server receives this request, it proposes a new communication stack if necessary, on the basis of a data item related to the request or of the communication network. If a stack is proposed by the terminal, the second server may actually select this stack. In order to select a new stack, the second server may also rely on the IP (Internet Protocol) address used by the terminal to transmit the request, for example if the address can be associated with an operator for which one or more communication stacks are associated. The data item may comprise, in one alternative, an information item about a protocol used in the request, the type of terminal transmitting the request, the occupancy of the communication network, the AS (Autonomous System) number, the type of access network of the communication network or else a combination of these various data.

The recommending of a new stack can consist in modifying one or more communication protocols making up the initial communication stack or else in changing the version of one or more protocols of the stack used by the terminal. The recommendation of a communication stack therefore incorporates either a recommendation of a protocol version or a change of protocol from among the various protocols making up the communication stack received by the first server in the request for a content. The advantage of recommending a communication stack rather than modifying the various protocols making up the stack one by one is to ensure a coherence in the various protocols making up the stack. In particular, if a protocol at the transport level is secure, it might be inopportune to select an application-related protocol which also proposes the feature of making secure, which would be redundant with the security function supported at the transport level.

By virtue of the recommendation method, in the case where the terminal, having initiated a data session with the first server, accepts the recommended stack received, then it continues this session with the second server, using the recommended stack received from the latter. In another embodiment, the terminal initiates a new session with the second server indicated by the first server in the redirection message. This new session is then established by the terminal, using the recommended communication stack received from the second server.

In one alternative, the first server itself provides the content and forms a single entity with the second server. The first server consists for example of several virtual entities, one of which provides the content requested by the terminal during establishment of the data session. In this alternative, the first server informs the terminal about the communication stacks to be used to obtain the content.

According to a first aspect, the method for recommending a communication stack furthermore comprises a step of sending the first server an information message comprising the recommended stack.

The second server informs the first server about the recommended stack which has been transmitted to the terminal. The information item transmitted by the second server can be advantageously used so that the first server knows the communication stacks supported by the second server and can, during a next session, inform a terminal about the communication stacks that it can use for the session. The information message will be dispatched before or after the second server has received a message of obtainment of the content transmitted on the basis of the recommended stack received from the terminal. Indeed, independently of the fact that the terminal has actually accepted the communication stack recommended by the second server, the information item transmitted to the first server gives it an indication about the communication stacks supported by the second server.

According to a second aspect, the message requesting obtainment of the content comprises at least one communication stack.

The terminal can advantageously inform the second server about the protocol stacks from among which it can select a stack to be used for the obtainment of the content by the terminal. On receipt of this information item, the second server can on the one hand identify at least one stack that it itself supports and avoid transmitting a recommendation message comprising a stack which would not be valid for the terminal. The dispatching of communication stacks by the terminal thus avoids slowing down access to the content for the terminal or preventing the establishment or the continuation of the session with the second server. In one option, the terminal can take account of the communication stacks transmitted by the first server so as to transmit to the second server only the communication stacks communicated by the first server. The communication stack present in the request then represents a relevant data item for choosing the recommended communication stack transmitted by the second server.

According to a third aspect, the recommended stack is transmitted in a field of the application layer of the recommendation message.

The information item relating to the recommendation of the stack can be transmitted in a field of the application layer. In particular, the recommendation message can comprise an information item of URL (Uniform Resource Locator) type to which the terminal will be able to connect in order to obtain a new communication stack that it can thereafter accept or reject, and if the former, use to obtain the content from the second server. The benefit of using the application layer is in particular to allow an implementation of the method in a communication network where the exchanges are made secure by security protocols at the network level or at the transport level. Thus, solely the information at the application level could be accessible. Moreover, recourse to transmission of the stack in the application layer can also be due to the sole support of this type of transmission by the second server and the terminal. Information in the headers of the RTP (Real-Time Transport Protocol), HTTP1, HTTP2 protocols can thus be used.

According to a fourth aspect, the recommended stack is transmitted in a field of the transport layer of the recommendation message.

The information item relating to the recommendation of the stack can be transmitted in a field of the transport layer, for example through a code which identifies the stack to be used to continue the session in progress or to initiate a new session on the basis of this stack. In particular, this information item can be transmitted through a code transmitted in the header of the QUIC (Quick UDP Internet Connections) protocol. Using the transport layer, secure or not, presents a dual-benefit. On the one hand the diversity of transport protocols is less relative to the application-related protocols and greater interoperability is probable. Moreover, if a secure transport protocol such as TLS is used, the recommendation message can be accessible by the terminal alone.

According to a fifth aspect, the data item relating to the communication network is received from a management entity of the communication network.

The reasons that could justify a terminal changing communication stack pertain in particular to policies relating to quality of service, which may involve the load of the second server, the bandwidths available on the access links of the communication network or indeed the agreements with operators intervening or using the communication network. A management entity, such as an administration platform of the network, a quality-of-service manager or an entity in charge of the interconnection links in the case where the communication network is operated by distinct operators, can transmit an information item making it possible to select a stack suitable for the context of the network. The second server can thus receive several data relating to the network and use this information, in addition to the information present in the obtainment request, to select the most suitable protocol stack.

The various aspects of the method for recommending a communication stack which have just been described can be implemented independently of one another or in combination with one another.

The invention also relates to a method for redirecting a content obtainment request relating to a data session initiated between a terminal and a first server in a communications network comprising a second server in charge of the provision of the content by delegation of the first server, the method being implemented by the first server and comprising:

A step of receiving from the terminal a message requesting the content

A step of detecting an incompatibility of the stack used by the terminal with a communication parameter of the second server, A step of sending the terminal a redirection message composed of a plurality of communication protocols and comprising an information item relating to a recommendation of a communication stack.

A first server invoked by a terminal to deliver a content, generally identified beforehand by a DNS resolution operated by a DNS server invoked by the terminal, usually redirects the terminal to a second server, either closer to the terminal, or better suited to provide a specific content, or to ensure a load distribution between content delivery servers. The first server, according to the prior art, merely redirects a terminal to a second server as a function of parameters of location and/or of type of application, or indeed as a function of relations between the first and the second server. In this invention, the first server affords additional functions since it detects that the terminal is not using an appropriate stack to obtain the content of a second server to which it will be redirected and it informs the terminal about the fact that the latter is not using a suitable stack.

The incompatibility of the stack used by the terminal can consist in that the stack used cannot be used for communication with the second server or else that the stack does not allow optimal use of the functions of the second server, for example in terms of quality of service, security or routing, or else that it is not suitable for the communication network between the terminal and the second server. To detect the incompatibility, it can use information present in the message of the obtainment request (IP addresses, communication protocols used, information transmitted by entities of the communication network for example to indicate problems of congestion and updates of the protocols supported by way of examples). Once it has detected this incompatibility, the first server informs the terminal either by advocating a new communication stack to be used, or by indicating to it that it must modify the communication stack, the recommendation of the stack to be used having thereafter to be transmitted by the second server during future exchanges with the terminal.

According to a first aspect, the redirection message furthermore comprises at least one communication stack.

The first server, as a supplement to the information item relating to a new stack to be used by the terminal, can advantageously transmit to the latter one or more stacks that it will be able to use to obtain the content from the second server. The redirection message thus indicates not only the second server that must be invoked by the terminal and the information item about a change of stack, but also one or more stacks to be used for the session in progress to be continued with the second server or the new session to be established with this second server. In one option, the first server can propose to the terminal communication stacks that are compatible with the second server, for example if the first server has stored the recommended stacks present in information messages transmitted by the second server. In another alternative, the first server can be based on a table indicating the stacks that are compatible with the various second servers to which a terminal is liable to be redirected.

According to a second aspect, the redirection method furthermore comprises a step of receiving from the terminal a message containing an information item of refusal of the recommended stack received.

It is recalled that the second server transmits to the terminal a stack recommended for the session initialized with the first server. The terminal might not accept the recommended stack transmitted by the second server. It can refuse the recommended stack because it does not support one of the communication protocols of the stack or else because the recommended stack is not compatible with the application used in the session or because it is not compatible with a policy of an operator providing a connection to the terminal. In one alternative, the terminal sends a message to the first server to indicate to it that it does not accept the recommended stack transmitted by the second server.

According to a third aspect, the communication parameter of the second server is a communication protocol.

When the first server redirects a terminal to a second server, for example a cache server, it can also inform the terminal that the stack used to initiate the session is not compliant with the second server to which the terminal will be redirected. The first server, to achieve this, can have access to a table in which are recorded the protocols supported by the second servers as well as their combinations forming permitted stacks. This table can for example be updated with the information messages received from the second servers during the invoking of terminals. The table can furthermore be more complete and take into account for example stacks for communication to services and/or terminals.

The various aspects of the redirection method which have just been described can be implemented independently of one another or in combination with one another.

The invention further relates to a device for recommending a communication stack, composed of a plurality of communication protocols, which relates to a data session initiated between a terminal and a first server for the provision of a content in a communications network, comprising a second server in charge of the provision of the content by delegation of the first server, the first server having detected an incompatibility of the stack used by the terminal with a communication parameter of the second server and having sent the terminal a redirection message comprising an information item relating to a recommendation of the stack to be used to obtain the content, characterized in that it comprises:

A receiver designed to receive a message from the terminal requesting obtainment of the content, A selection module designed to select a stack to be recommended as a function of a data item relating to the communication network or to the obtainment request message received, A sender designed to send the terminal a recommendation message comprising the recommended stack, A receiver designed to receive a message transmitted by the terminal by using the recommended stack and relating to the obtainment of the content.

This device, able to implement in all its embodiments the method for recommending a communication stack, which has just been described, is intended to be implemented in a data server.

The invention also relates to a device for redirecting a content obtainment request relating to a data session initiated between a terminal and a first server in a communications network comprising a second server in charge of the provision of the content by delegation of the first server, characterized in that it comprises:

A receiver designed to receive a message requesting the content from the terminal, A detector designed to detect an incompatibility of the stack used by the terminal with a communication parameter of the second server, A sender designed to send the terminal a redirection message composed of a plurality of communication protocols and comprising an information item relating to a recommendation of a communication stack.

According to one aspect, the redirection device furthermore comprises a receiver designed to receive from the terminal a message containing an information item of refusal of the recommended stack received.

This device, able to implement in all its embodiments the redirection method which has just been described, is intended to be implemented in a data server.

The invention also relates to a computer program comprising instructions for the implementation of the steps of the method for recommending a communication stack, which has just been described, when this program is executed by a processor.

The invention also relates to a computer program comprising instructions for the implementation of the steps of the redirection method, which has just been described, when this program is executed by a processor.

These programs can use any programming language, and be in the form of source code, object code, or of code intermediate between source code and object code, such as in a partially compiled form, or in any other desirable form.

The invention also envisages an information medium readable by a computer, and comprising instructions of the computer programs such as mentioned hereinabove.

The information medium can be any entity or device capable of storing the programs. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The programs according to the invention can be in particular downloaded over a network of Internet type. Alternatively, the information medium can be an integrated circuit in which the program is incorporated, the circuit being adapted to execute or to be used in the execution of the methods in question.

PRESENTATION OF THE FIGURES

Figure 2:
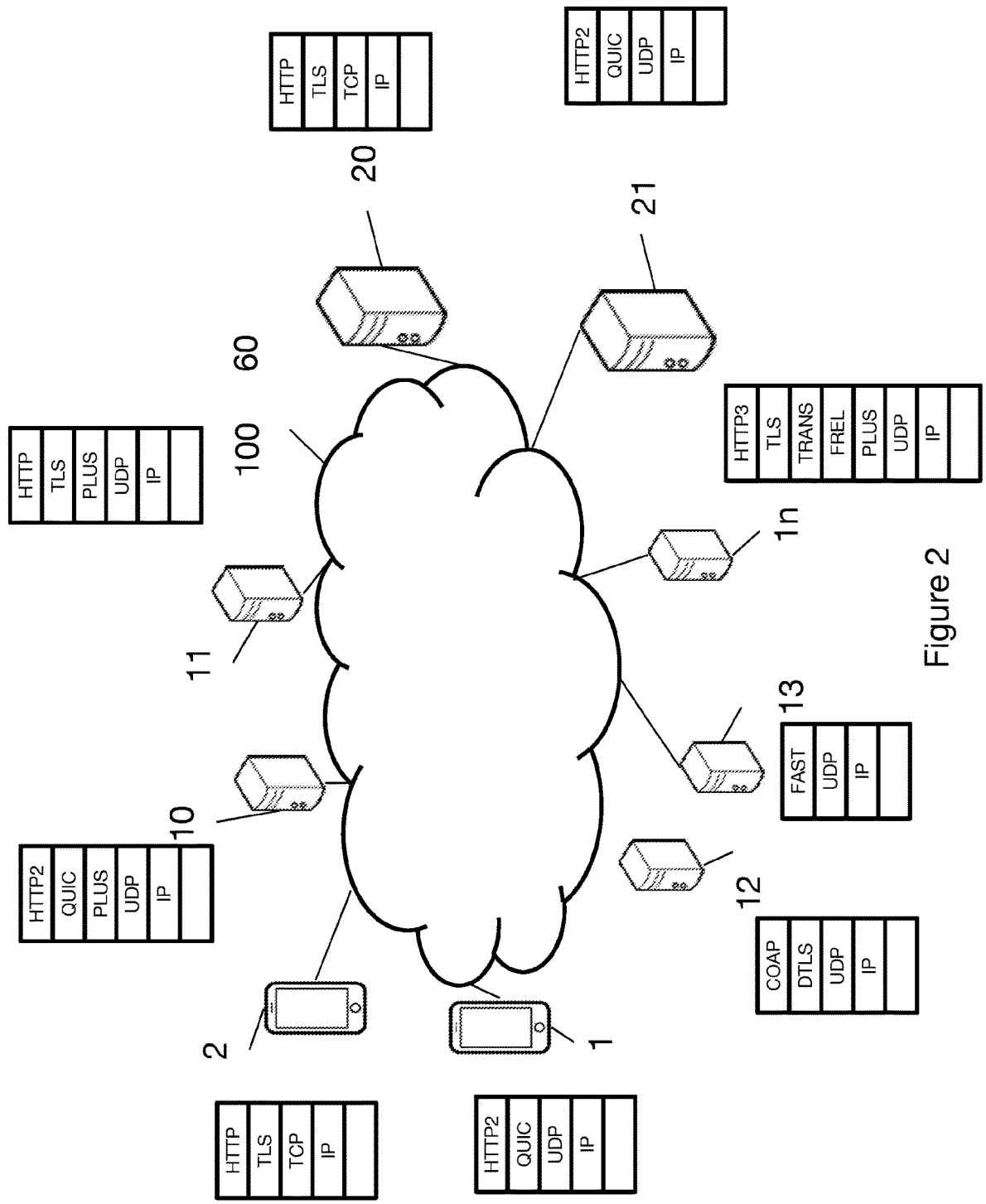
Figure 3:
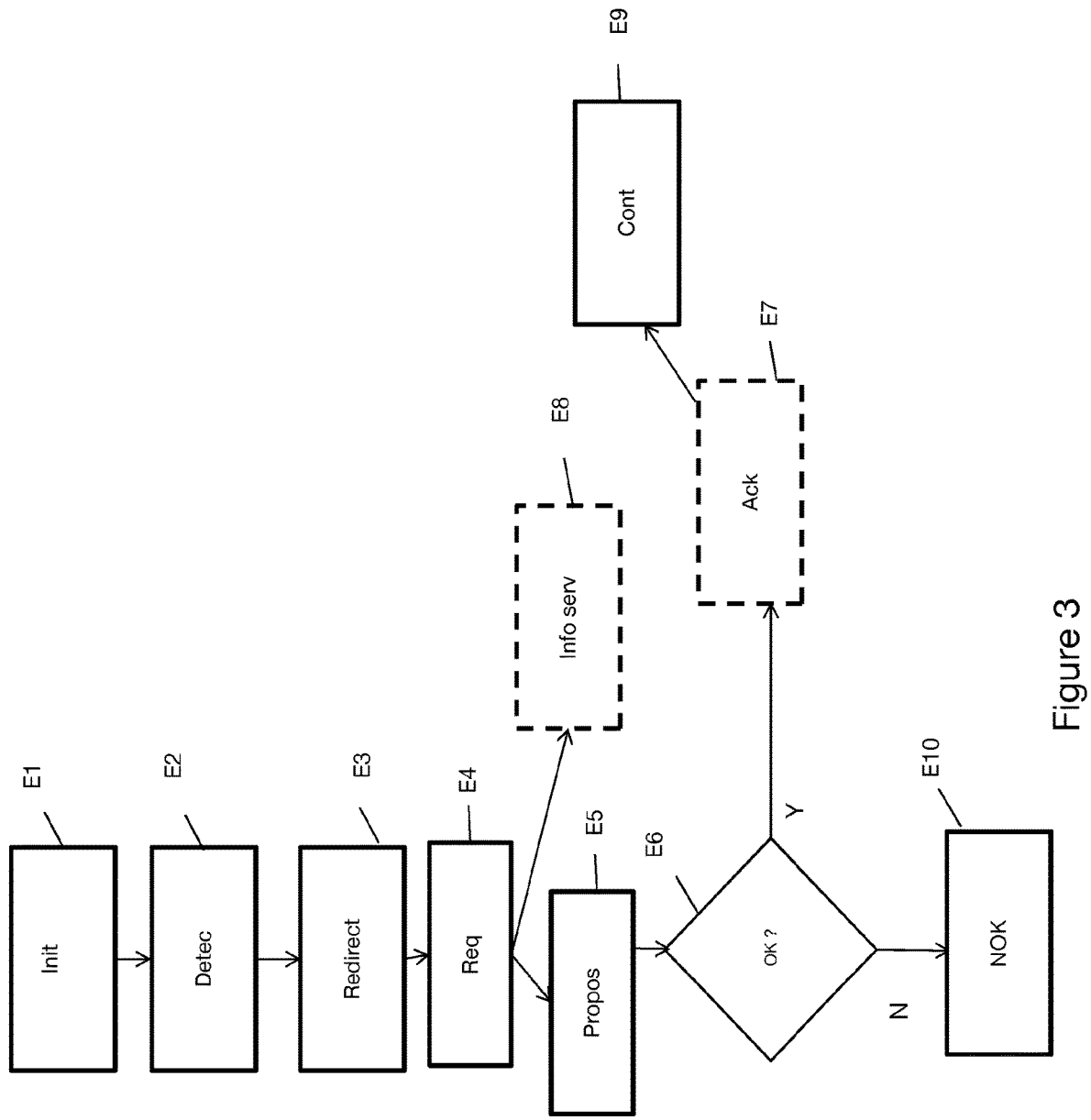
Figure 4:
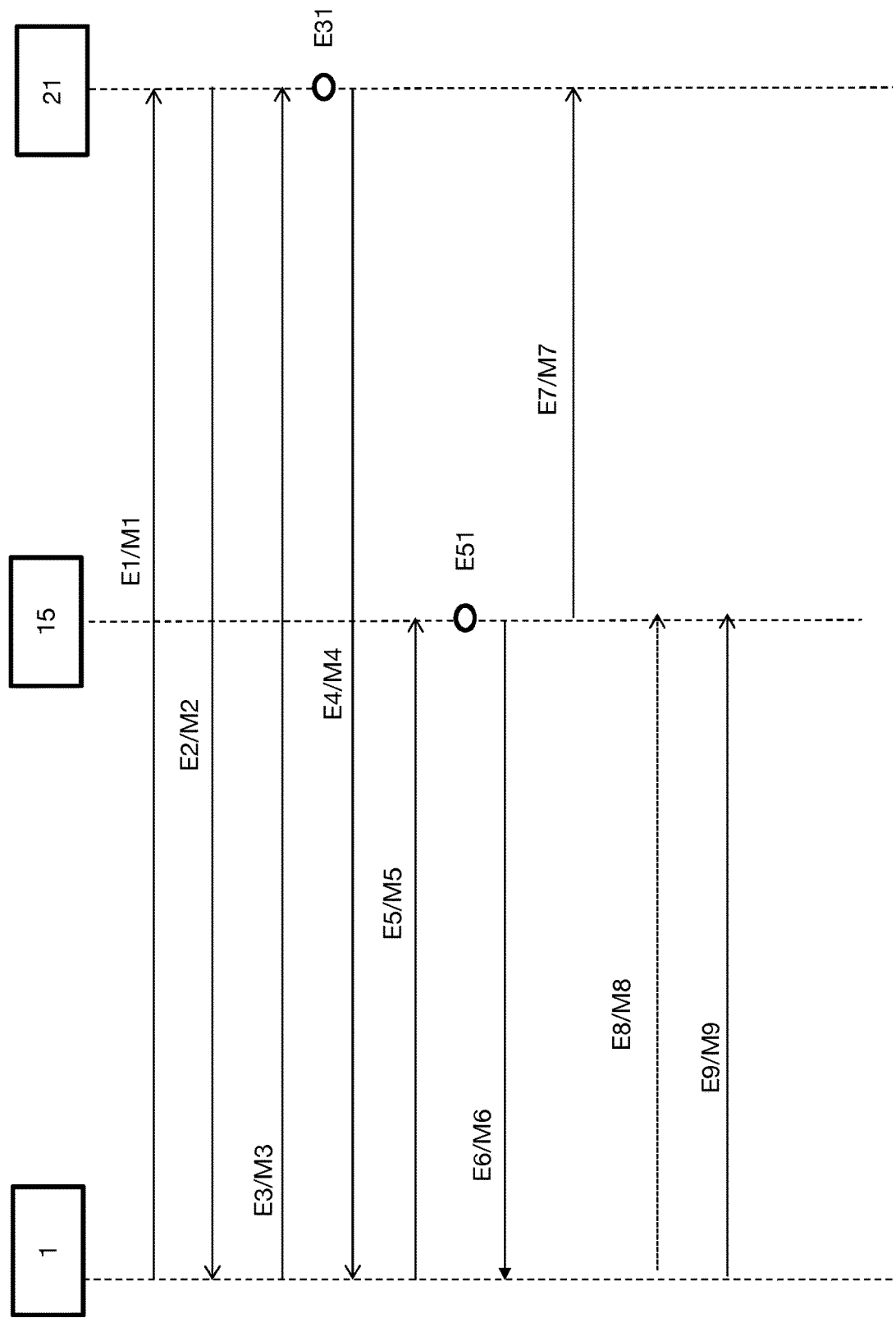
Figure 5:
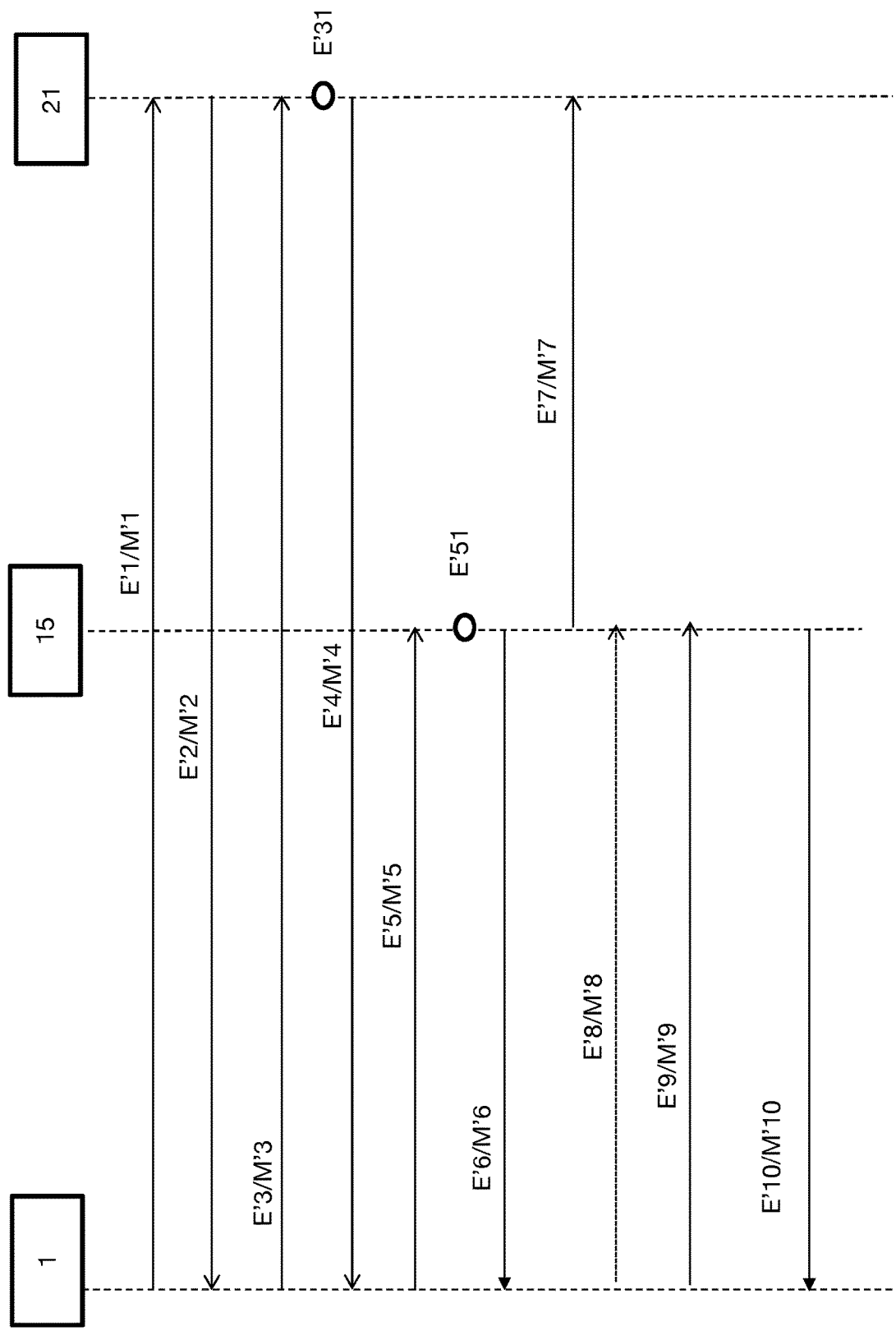
Figure 6:
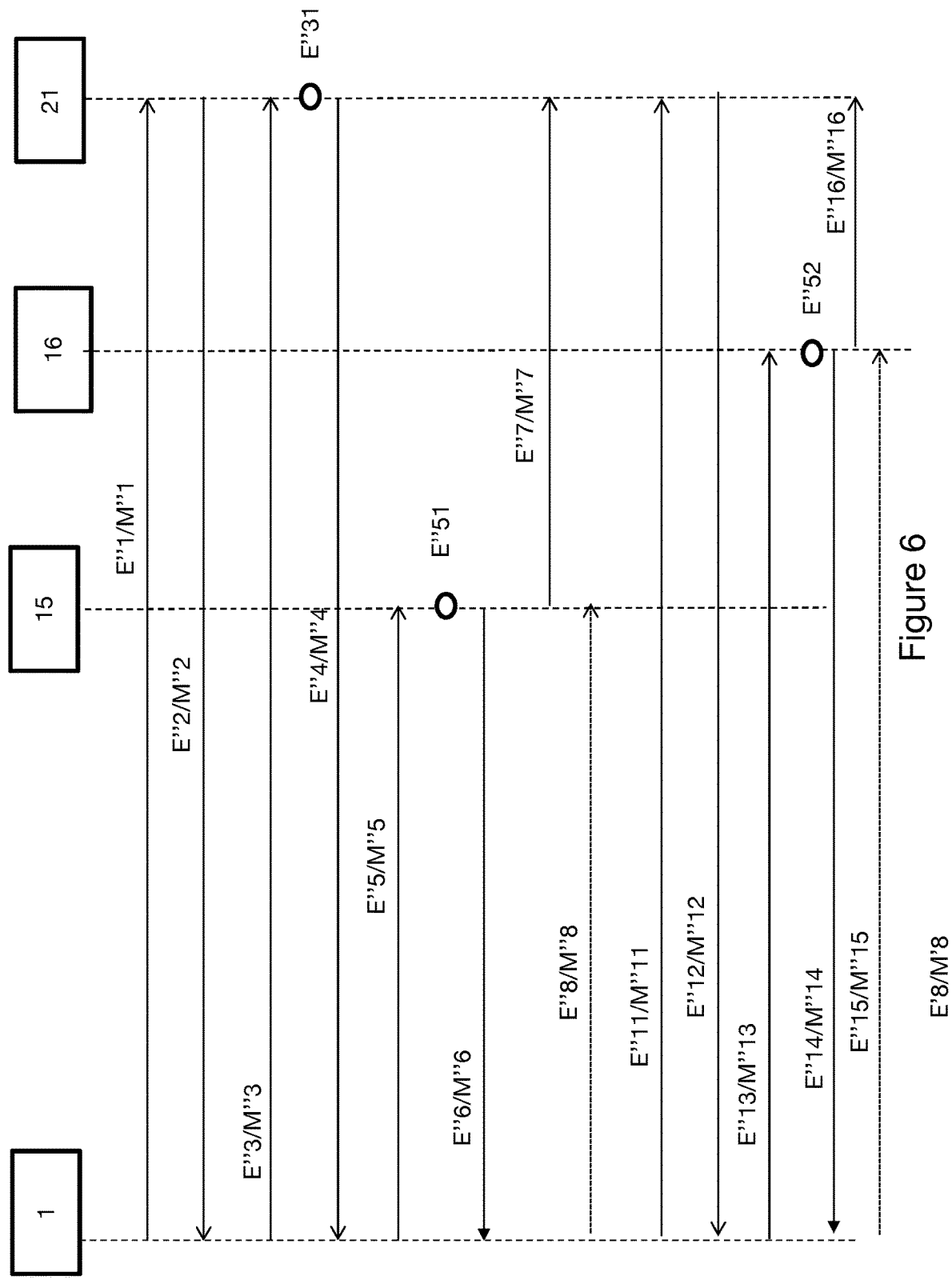
Figure 7:
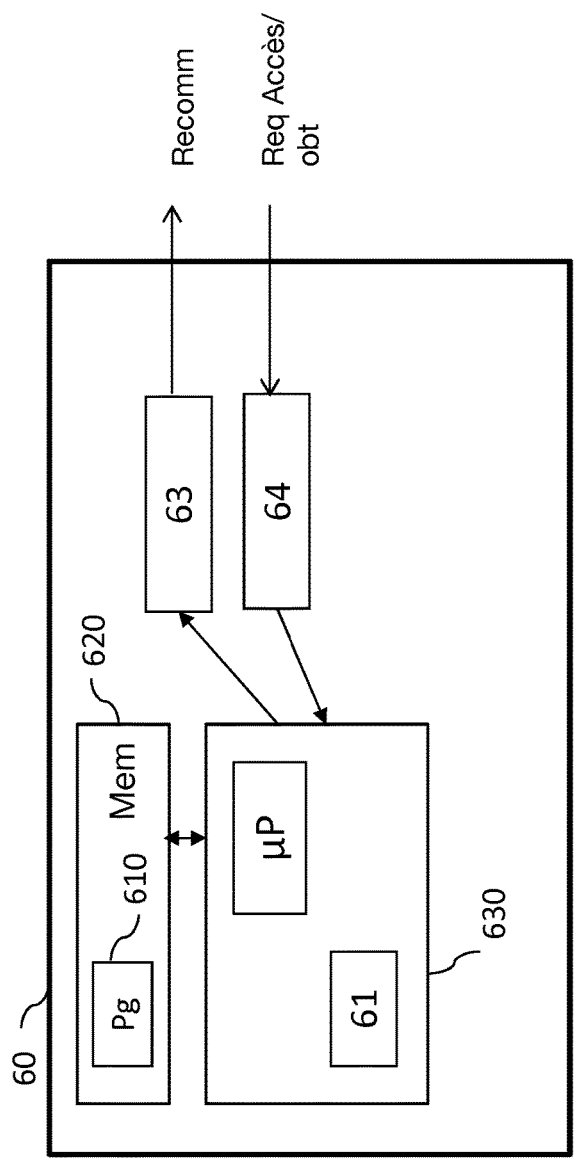
Figure 8:
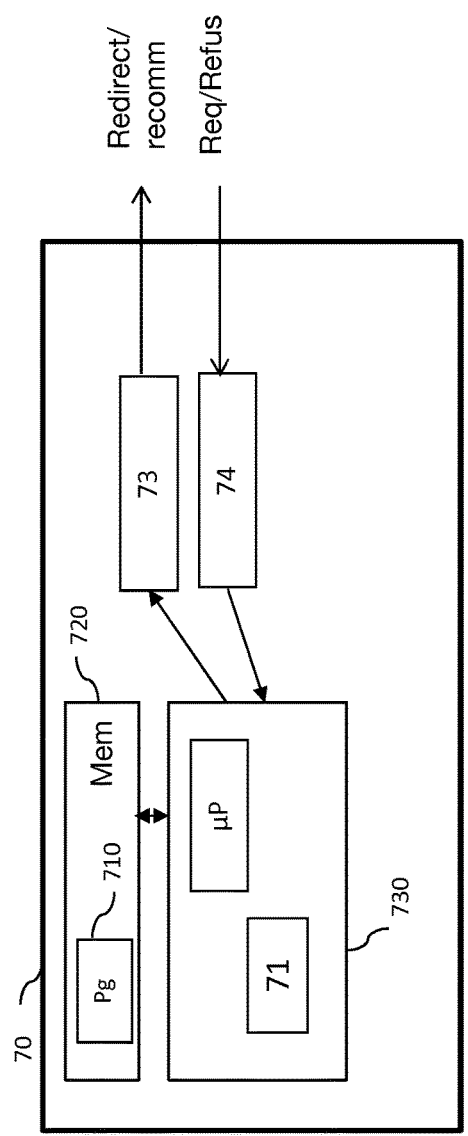

Other advantages and characteristics of the invention will become more clearly apparent on reading the following description of a particular embodiment of the invention, given by way of simple illustrative and nonlimiting example, and the appended drawings, among which:

FIG. 1 presents in a schematic manner an architecture of the communications network where the method for recommending a communication stack, according to the invention, is implemented, FIG. 2 presents situations in which the method for recommending a communication stack is required, according to one aspect of the invention, FIG. 3 presents an overview of the method for recommending a communication stack, FIG. 4 presents the various steps of the method for recommending a communication stack, according to a first embodiment of the invention, FIG. 5 presents the various steps of the method for recommending a communication stack, according to a second embodiment of the invention, FIG. 6 presents the various steps of the method for recommending a communication stack, according to a third embodiment of the invention, FIG. 7 presents an exemplary structure of a device for recommending a communication stack, according to one aspect of the invention, FIG. 8 presents an exemplary structure of a redirection device, according to one aspect of the invention.

DETAILED DESCRIPTION OF AT LEAST ONE EMBODIMENT OF THE INVENTION

In the subsequent description, examples are presented of several embodiments of the invention based on IP (Internet Protocol) protocols, but the invention also applies to other communication protocols.

Reference is firstly made to FIG. 1 which presents in a schematic manner an architecture of the communications network where the method for recommending a communication stack is implemented. In this figure, a communications network 100 is used to carry the communication streams between the terminals 1 and 2, the first content servers 20 and 21 and the second content servers 10, 11, 12, 13, 1n which are deployed to actually provide the contents initially requested by the terminals 1, 2 to the servers 20 and 21. A terminal may be according to the embodiments, a fixed or mobile terminal, a server, an M2M (machine to machine) terminal, a gateway or any other item of equipment with capability of establishing a data session with another item of equipment. The content servers 20, 21 are also called first servers in this document and can in particular be, according to the embodiments, HTTP (Hypertext Transfer Protocol) servers, FTP (File Transfer Protocol) servers, CDN (Content Delivery Networks) servers, servers where contents are stored temporarily (cache servers). The servers 10, 11, 12, 13, 1n are servers which are usually positioned nearer the terminals than the first servers invoked by a terminal and their main object is to safeguard the bandwidth in the networks and to improve the quality of experience of the users using the terminals 1, 2. These servers 10, 11, 12, 13, 1n usually have an agreement with the entities managing the first servers 20, 21 to host certain contents proposed by the servers 20, 21 and can be cache servers or indeed CDN servers, depending on the embodiments. The communication network 100 can be an IP network implemented to provide the so-called "fixed" or "mobile" services. It may in particular entail a network of ADSL (Asymmetric Digital Subscriber Line) type, of 3GPP (3rd Generation Partnership Project) type, a network for company services or a network for residential customer services.

In conjunction with FIG. 2, situations are now presented presented in which the method for recommending a communication stack is required, according to one aspect of the invention.

The terminal 1 establishes a session with the server 21 on the basis of the IP, UDP (User Datagram Protocol), QUIC (Quick UDP Internet Connections), HTTP2 communication protocols. This session will have been preceded in particular by a connection of the terminal 1 to the communication network 100 and probably by a request and response of DNS (Domain Name Server) type so that the terminal recovers the IP address of the content server 21 also called first server. The IP/UDP/QUIC/HTTP2 communication protocols making up the communication stack used by the terminal 1 to establish a session with the server 21 can be selected by default. Communication protocols or versions of protocols of this stack can also give rise to a negotiation between the server 21 and the terminal 1 for example by using information of "Alternate services" type conveyed in an HTTP field and pertaining to known techniques.

The terminal 2 establishes a session with the server 20 using an HTTP/TLS/TCP/IP communication stack according to techniques comparable to what was described for the session between the terminal 1 and the first content server 21.

The content servers 20 and 21 can in certain cases provide the contents requested by the terminals 2 and 1, but usually the content servers will redirect the terminals to other servers in charge of delivering the requested contents to the terminals 1 and 2. The choice of one or more servers 10, 11, 12, 13, 1n is made as a function of the agreements between first content servers and second servers (which may also be called intermediate servers) and also as a function of the location of the terminals 1 and 2 so as to select a second server as close as possible to the terminal that requested a content. The second server can also be selected as a function of the type of content requested (audio, video, text . . . ). The servers 10, 11, 12, 13, 1n can be managed, according to the case, by the operator of the communication network 100, by an entity also managing the servers 20, 21 or by another entity, for example in charge of the management of the second servers and of the service for delivering the associated contents. As indicated in FIG. 2, by way of example, the second servers are liable to implement one or more communication stacks, which are identical to and/or different from the communication stacks supported by the terminals 1, 2 and the servers 20, 21. The choice of the support of certain protocol stacks can depend on the contents proposed by these second servers, on the entities managing these second servers, or indeed on the technological maturity of these servers. In the embodiment presented in FIG. 2, each second server comprises a single communication stack for the purposes of clarity but one and the same server may possess several communication stacks. The number of protocols in a communication stack is not limited a priori. Thus, in FIG. 2, a communication stack can possess 3 communication protocols just as for the second server 13 or else 7 like the second server 1n.

Reference is now made to FIG. 3 which presents an overview of the method for recommending a communication stack.

In the course of a step E1, a terminal initiates a data session with a first content server, this having probably been communicated to the terminal during exchanges with a connection server of DNS type. This data session is established using a communication stack composed of several protocols. This communication stack can be a default stack or a communication stack negotiated with the first content server for example using a Websocket if it entails a change of HTTP version. This modification is related to the session initialized between a terminal and a first content server but does not make it possible to accommodate the communication stack of a second server which will possibly be communicated to the terminal in order to actually deliver the content desired by the terminal during the establishment of the session.

During a step E2, the first content server detects that the request, relating to the data session established, for a content is transmitted using a communication stack that is not compatible with a communication stack of a second server to which the terminal will be redirected. If the terminal uses for example the QUIC protocol from among the protocols of the communication stack, the server can detect a non-compatible QUIC version. In one alternative, the first content server can identify one or more communication protocols that are not compatible in the communication stack used by the terminal with what is supported by the second server. The mode of detection is specific to the first content server and can take account of versions of protocols, of protocols or indeed of a combination of protocols knowing that a first content server could consider that protocols taken independently of one another are compatible, but that a combination of protocols might not be acceptable with respect to what is supported by a second server. The combination of protocols may, in another case, not be suited to a network context, for example related to congestion, or to a given service.

In a step E3, the first content server transmits a message of redirection to the terminal communicating to it a second server that it must reach to obtain the desired content, initially requested in the session initialized with the first content server. This redirection message can comprise the IP address at which it is possible to reach the second server, which is considered here to be a cache server or else a URL which will be used to interrogate a DNS server and recover an IP address of the cache server. The redirection message can therefore be an HTTP message of 3xx type (https://en.wikipedia.org/wiki/List_of_HTTP_status_codes). This message must furthermore comprise an information item indicating to the terminal that a modification of the communication stack is necessary. This information item can consist in adding a variable for example of "Change stack" type which will be set to the value 1. In another embodiment, if the first content server is aware of communication stacks that are compatible with the second server and if it is capable of transmitting a stack, the information item can consist of a proposal of communication stack(s) in addition or alternative to the variable sent.

On receipt of this redirection message, the terminal during a step E4 sends a request to obtain the content to the second server identified in the redirection message, if necessary by having obtained the IP address by invoking a DNS server beforehand. According to one alternative, the terminal transmits the request while indicating in the request message the communication stack(s) communicated by the first content server, if this is the case. If the terminal has not received any stack from the first content server or if it is not possible for it to transmit the stack(s) received, it transmits the request without proposing any communication stack. The terminal then dispatches a request for obtainment of the content without any indication about the stack or stacks to be used.

During step E5, the second server responds to the terminal through a message indicating to it to change communication stack. If it received one or more communication stacks during step E4, it can select one or more of these stacks to propose them to the terminal and if the terminal has not indicated any stack(s) to it in its request message, the second server determines at least one such so as to propose it or them to the terminal. The choice of a stack to be transmitted to the terminal can depend on the type of content requested by the terminal, on the stacks supported by the second server, on the client that dispatched the request or on any other type of information item. If several communication stacks are possible, the second server can rank them by order of preference so that the terminal chooses the first compatible stack on receipt of this proposal.

Optionally, during a step E8, the second server can inform the first content server by indicating the communication stacks proposed to the terminal. This option presents the advantage for the second server of regularly informing the first content server about the stacks that it supports. By virtue of this information item, the first content server can transmit to the terminals the proposals of communication stacks to the terminals in the redirection messages corresponding to step E3.

When the terminal receives the message comprising the protocol stack proposal from the second server, it analyzes the proposals and determines whether it can accept one of the proposed stacks or else whether it must refuse the proposal. During step E6, the terminal accepts or rejects one of the proposed stacks. This choice is made as a function of the capabilities of the terminal, in particular as a function of the protocols supported by the terminal and/or of the possibilities of it configuring itself so as to use one of the proposed stacks. If it has the capability of accepting more than one stack proposed by the second server, it uses an algorithm to select one of the stacks, for example by choosing the first stack of the list.

If the terminal does not select any stack proposed by the second server, several options are possible. It can invoke the first content server again during a step E10 and indicate to it that the change of stack is not possible with the second server indicated in the redirection message. The first content server, on receipt of this message, will be able to indicate another second server to the terminal while maintaining the indication of change of stack. It will alternatively be able to indicate to the terminal that it re-contact the same second server but this time without indicating to the terminal that it change stack. It will be able, in yet another option, to provide the desired content to the terminal without using a second server.

If the terminal accepts one of the stacks proposed by the second server, it then optionally transmits an acknowledgment message during a step E7 to the second server and thereafter transmits during a step E9 a request to the second server to obtain the desired content using the selected communication stack. This request, according to one option, can be transmitted using the data session in progress, initially implemented with the first content server. In another option, the terminal initiates a new session with the second server so as to transmit the request for obtainment of the content to the second server. If the communication stack is greatly modified, in particular as regards the network and/or transport level communication protocol, a new session is established between the terminal and the second server.

The various steps of the method for recommending a communication stack, according to a first embodiment of the invention, are presented in conjunction with FIG. 4.

During a step E1, the terminal 1 transmits a session initialization message M1 to a CDN server 21 by using a QUIC/UDP/IP communication stack: (port a). The CDN server 21 responds to the terminal 1 through an acknowledgment message M2 during a step E2. The terminal 1 transmits thereafter in the course of a step E3 a message M3 requesting a content to the CDN server 21 by using the same QUIC/UDP/IP communication stack as for the message M1 and while indicating furthermore through an information item present in a header that it is favorable to use an operator's cache server. The CDN server 21 detects during step E31 that the protocols used by the terminal 1 to send the message M3 are not compatible with a communication parameter of the cache server 15 to which it will redirect the terminal 1. According to the embodiments the server 21 can take into account the IP address of the terminal 1, a parameter of quality of service, the clogging up of the communication network used to carry the request, the type of the terminal 1 (tablet, PC, telephone . . . ), the type of access network of the terminal 1, a routing information item to detect non-compatibility. The server 21 can furthermore rely on a table to identify the compatibilities of the protocol stacks with the cache servers. The CDN server thereafter dispatches a redirection message of HTTP 301 type or any other code appropriate to the situation, in a message M4 during step E4. This redirection message comprises an IP address of the cache server 15 that must be contacted by the terminal 1 or else an information item of FQDN type which will ultimately make it possible to obtain the IP address of the cache server 1 subsequent to a resolution of DNS type, or else an information item of URL type allowing the terminal 1 to reach the cache server 15. The redirection message, in one alternative, can be an OOB (Out-Of-Band) message such as defined in https://tools.ietf.org/html/draft-reschke-http-oob-encoding-10. Other types of messages M4 making it possible to redirect a terminal to a cache server can be envisaged for example by using the DNS messages. The redirection message M4 furthermore comprises a variable S set to 1 indicating to the terminal 1 that the redirection is accompanied by a change of communication stack. In this embodiment, the CDN server 21 furthermore proposes an RTP/TLS/UDP/IP communication stack to be used. The change-stack variable S and the recommended stack are conveyed in a field of the QUIC protocol in this embodiment. The RTP/TLS/UDP/IP communication stack is for example coded 11 in the QUIC field, thereby allowing the terminal 1, on receipt of the variable S set to 1 and the code 11 in the QUIC field, to identify the RTP/TLS/UDP/IP communication stack recommended by the CDN server 21.

On receipt of the redirection message M4, the terminal 1 transmits a request for obtainment of the content to the cache server 15 in a message M5 transmitted in step E5. In this embodiment, the message M5 comprises the RTP/TLS/UDP/IP communication stack communicated by the CDN server 21 or else a code corresponding to this communication stack. At this juncture, the information item about the communication stack is not yet validated or refuted by the cache server 15.

The cache server 15, when it receives this request, identifies the communication stack used by the terminal 1 to communicate with it and selects a new stack in the course of a step E51. The terminal 1 having proposed a communication stack in the message M4, the cache server 15 analyzes the proposed stack and if it is a stack that it supports, transmits a message M6 proposing to the terminal 1 that it modify its communication stack and use the recommended stack, such as transmitted by the terminal 1 in the message M5 in this embodiment. If it does not support the communication stack proposed by the terminal 1 or if it prefers to propose another communication stack, the cache server 15 can select another communication stack to transmit it another stack to the terminal 1 in the message M6. If the terminal uses the QUIC/UDP/IP stack, the information relating to the communication stacks can advantageously be transmitted in a field of the QUIC protocol. The selection of a new communication stack can take into account various parameters, among which are the IP address used by the terminal 1 to transmit the request, the type of the terminal 1, the access network used by the terminal 1, parameters of quality of service of the communications network interconnecting the terminal 1 and the CDN server 21 or any other information item making it possible to refine the selection of a communication stack.

The cache server 15 in an optional step E7 transmits a message M7, indicating to the CDN server the communication stack proposed to the terminal 10. This information item transmitted to the CDN server allows the latter to update the lists of protocol stacks supported or indeed recommended by the cache server. The CDN server will be able to use this information item during a next connection of a terminal to indicate thereto one or more communication stacks.

During a step E8, the terminal 1, when it receives the message M6, transmits a message M8 of acknowledgment to the cache server 15 indicating thereto proper receipt of the message.

In the case where the terminal 1 accepts the communication stack recommendation and the stack proposal from the cache server, in a step E9, it transmits a new message M9 requesting obtainment of the content, this time using the communication stack proposed by the cache server 15. In this embodiment, the request message is transmitted using the RTP/TLS/UDP/IP communication stack.

In the embodiment described hereinbelow, the CDN server 21 and also the cache server 15 can propose several communication stacks to the terminal during the respective steps E4 and E6. The terminal 1 can also suggest several communication stacks in the message M5, for example if it has itself received several such from the CDN server. The cache server 15 can select a communication stack so as to recommend the stack used by the terminal 1 while taking into account at least one information item relating to the obtainment request received for a content, for example the type of content requested, the IP address used by the terminal 1 to communicate with the cache server 15, a parameter of quality of service of the session.

The various steps of the method for recommending a communication stack according to a second embodiment of the invention are presented in relation to FIG. 5.

This embodiment differs from the first embodiment described hereinabove through the type of protocol used to recommend a communication stack to the terminal and through the types of the servers.

In this embodiment, the terminal 1 wishes to obtain a multimedia content (video, audio, text) from a first content server 21, which may be an HTTP server, an FTP server or any other type of server, which will redirect the terminal 1 to a CDN server 15. The exchanges related in particular to the DNS service are not represented in the figure. In this embodiment it is considered that the content server 21 is an HTTP server (referenced as first server).

The first three steps E'1, E'2, E'3 are identical to steps E1, E2, E3 of FIG. 4 and can therefore be borrowed from the description proposed in respect of FIG. 4 except that the request for obtainment of a content is transmitted by the terminal 1 using the (HTTP/2)/QUIC/UDP/IP communication stack.

The HTTP server 21 detects during step E'31 that the protocols used by the terminal 1 to send the message M'3 are not compatible with a communication parameter of the CDN server 15 (referenced as second server) to which it will redirect the terminal 1 in a manner comparable to what is described in respect of step E31 of FIG. 4.

During step E'4, the content server 21 transmits a message M'4 of redirection to the terminal 1. This message comprises an information item about the CDN server 15 to be reached. It furthermore comprises a redirection information item, for example a variable S, transmitted in a field of one of the protocols of the communication stack used by the terminal 1 to establish a data session with the HTTP server 21. In this embodiment, it is considered that the server 21 transmits this information item in the QUIC protocol. The HTTP server 21 does not indicate any communication stack to the terminal 1. The connection between the terminal 1 and the server 21 may be encrypted, for example using the TLS protocol since the information item relating to the change of communication stack is exchanged only between the server 21 and the terminal 1.

In step E'5, the terminal 1 transmits an obtainment request message M'5 to the CDN server 15 to obtain the content requested in step E'1. This request does not contain any communication stack, in particular because it has not received any stack proposal in the message M'4 dispatched by the server 21.

During step E'51 the CDN server 15 selects a communication stack to be recommended to the terminal 1. This selection takes place in a comparable manner to step E51 of FIG. 4 even though the data used to select a new communication stack may differ from situation to situation.

The CDN server 15 transmits a communication stack recommendation message M'6 to the terminal 1. The CDN server 15, in this embodiment, transmits the information item about the communication stack to be used in a field of the HTTP/2 protocol to inform the terminal to use the RTP/TLS/UDP/IP communication stack to obtain the content. To decide on the choice of communication stack, in the absence of a proposal from the terminal 1, the CDN server 15 can during step E'51 of determining the communication stack, reach the HTTP server 21 so as to obtain information allowing it to select a stack.

Steps E'7, E'8 and E'9 are comparable to steps E7, E8 and E9 of FIG. 4.

The CDN server 15 can furthermore transmit during a step E'10 a message M'10 of acknowledgment to the terminal 1.

The various steps of the method for recommending a communication stack according to a third embodiment of the invention are presented in relation to FIG. 6.

This embodiment differs from the first two through the fact that the terminal 1 refuses the first stack recommended by the second server and invokes the first server again. This embodiment differs furthermore from the first two embodiments through the protocols used in the exchanges between the terminal 1 and the servers.

The first steps of E"1 to E"7 are equivalent to steps E'1 to E'7 of FIG. 5. The difference is that the terminal 1 uses an (HTTP/2)/TLS/TCP/IP protocol stack to communicate with the HTTP server 21 and the CDN server 15. Furthermore, the information item about the RTP/TLS/UDP/IP communication stack proposed by the CDN server 15 is transmitted in an extension to the TLS (Transport Layer Security) protocol. When the terminal 1 receives the communication stack proposal in the TLS extension of the message M"6, it acknowledges receipt of the message M"6 by dispatching an acknowledgment message M"8 in a step E"8.

However, it does not accept the communication stack proposed by the CDN server 15. This refusal can be explained by the fact that it does not support a protocol or a version of protocol of the proposed stack or because the proposed stack is not compatible with the policy of the operator providing access to the communication network of the terminal, or indeed by refusal of the client to which the terminal 1 belongs.

In this embodiment, the terminal 1 dispatches a message M"11 in the course of step E"11 requesting obtainment of the content, identical to the message E"3. It is possible for it to notify in this message an indication allowing the HTTP server 21 to know that it is refusing a communication stack proposed by the CDN server to which the server 21 has redirected it. The HTTP server 21 responds to it during step E"12 by transmitting to it a message comparable to the message M"4 but redirecting the terminal 1 to another second server 16, and optionally by proposing a communication stack supported by the second server 16. The following steps E"13, E"51, E"14, E"15, E"16 and the corresponding messages are identical to the respective steps E"5, E"51, E"6, E"8, E"7 and to the corresponding messages, except that the CDN server 16 replaces the CDN server 15 in the exchanges.

According to one alternative, during step E"6 the CDN server 15 can dispatch a list of communication stacks to the terminal 1, the last communication stack of the list being a default stack (for example HTTP/UDP/IP) which is supported by any type of terminal, thus enabling the terminal to obtain its content.

An exemplary structure of a device for recommending a communication stack according to one aspect of the invention is now presented in conjunction with FIG. 7.

The device 60 for recommending a communication stack implements the method for recommending a communication stack, various embodiments of which have just been described.

Such a device 60 can be implemented in an item of equipment of CDN server type or in a cache server or indeed in a storage server present in the communication network.

For example, the device 60 comprises a processing unit 630, equipped for example with a microprocessor µP, and driven by a computer program 610, stored in a memory 620 and implementing the method for recommending a communication stack according to the invention. On initialization, the code instructions of the computer program 610 are for example loaded into a RAM memory, before being executed by the processor of the processing unit 630.

Such a device 60 comprises:
  A receiver (64) of a message requesting obtainment of the content from a terminal,
  A selection module (61) for selecting a stack to be recommended as a function of a data item relating to the communication network or to the obtainment request message received,
  A sender (63) of a recommendation message comprising the recommended stack destined for the terminal,
  A receiver (64) of a message of obtainment of the content transmitted by the terminal by using the recommended stack.

Advantageously, the device 60 can comprise:
  A sender (63) of an information message comprising the recommended stack destined for a first server.

An exemplary structure of a redirection device according to one aspect of the invention is now presented in conjunction with FIG. 8.

The redirection device 70 implements the redirection method, various embodiments of which have just been described.

Such a device 70 can be implemented in an item of equipment of CDN server type or in a Web server or more generically in any server invoked to provide a content (data, audio, video).

For example, the device 70 comprises a processing unit 730, equipped for example with a microprocessor µP, and driven by a computer program 710, stored in a memory 720 and implementing the method for recommending a communication stack according to the invention. On initialization, the code instructions of the computer program 710 are for example loaded into a RAM memory, before being executed by the processor of the processing unit 730.

Such a device 70 comprises:
  A receiver (74) of a message requesting a content from a terminal,
  A detector (71) of an incompatibility of the stack used by the terminal with a communication parameter of a second server, A sender (73) of a redirection message composed of a plurality of communication protocols and comprising an information item relating to a recommendation of a communication stack, to the terminal.

Advantageously, the device 70 can comprise:
- a receiver (74) of a message, sent by the terminal, containing an information item of refusal of the recommended stack received,
- a receiver (74) of an information message comprising the recommended stack originating from the second server.

The modules described in conjunction with FIG. 7 and FIG. 8 can be hardware modules or software modules.

The exemplary embodiments of the invention which have just been presented are only a few of the conceivable embodiments. They show that the invention makes it possible to manage the growing complexity of communication network architectures which is due in particular to the development of the protocols with various layers (network, transport, application . . . ). This development of the layers and the various possible combinations for building the communication stacks used by the terminals, the first servers and the second servers to communicate require novel solutions. The invention described in this document makes it possible to intervene on the selection of a communication stack appropriate for the content desired by a terminal and suited to the constraints of the networks. Through the implementation of this invention, the first server invoked initially by the terminal to provide a content, the second server in charge of actually providing the content and also the terminal of a user, can intervene to select or not select a communication stack. This invention can also be used for example by a first server to steer a terminal toward a second server which is compatible with a communication stack used by a terminal. This invention can therefore be exploited to determine a second server and to supplement the decision tree of the first server to select a second server on the basis of enriched parameters comprising the communication stack to be used, the location of the terminal, the loading of servers.

The invention claimed is:

1. A method for recommending a communication stack composed of a plurality of communication protocols, which relates to a data session initiated between a terminal and a first server for the provision of a content in a communications network comprising a second server in charge of the provision of the content by delegation of the first server, the method being implemented by the second server and comprising:
   receiving from the terminal a message requesting obtainment of the content,
   selecting by the second server a stack to be recommended as a function of a data item relating to the communication network or to the obtainment request message received from the terminal,
   sending to the terminal a recommendation message comprising the recommended stack, which includes a plurality of communication protocols,
   receiving a message relating to obtainment of the content, transmitted by the terminal by using the selected recommended stack sent by the second server to the terminal.

2. The method for recommending a communication stack as claimed in claim 1, furthermore comprising sending the first server an information message comprising the recommended stack.

3. The method for recommending a communication stack as claimed in claim 1 where the message requesting obtainment of the content comprises at least one communication stack.

4. The method for recommending a communication stack as claimed in claim 1, where the recommended stack is transmitted in a field of the application layer of the recommendation message.

5. The method for recommending a communication stack as claimed in claim 1, where the recommended stack is transmitted in a field of the transport layer of the recommendation message.

6. The method for recommending a communication stack as claimed in claim 1, where the data item relating to the communication network is received from a management entity of the communication network.

7. A method for redirecting a content obtainment request relating to a data session initiated between a terminal and a first contend server in a communications network comprising a second server in charge of the provision of the content by delegation of the first content server, the method being implemented by the first content server and comprising:
   receiving from the terminal a message requesting the content using a communication stack;
   detecting an incompatibility of the communication stack used by the terminal to request the content from the first server with a communication parameter of the second server; and
   sending the terminal a redirection comprising at least one communication stack, which includes a plurality of communication protocols that are compatible with the second server and are configured to be used by the terminal to obtain the content from the second server.

8. The redirection method as claimed in claim 7, furthermore comprising a receiving from the terminal a message containing an information item of refusal of the recommended stack received.

9. The redirection method as claimed in claim 7, where the communication parameter of the second server is a communication protocol.

10. A second server for recommending a communication stack, which includes a plurality of communication protocols relating to a data session initiated between a terminal and a first server for provision of a content in a communications network; comprising the second server, which is in charge of the provision of the content by delegation of the first server, wherein the second server comprises:
   a receiver;
   a sender;
   a processor; and
   a non-transitory computer-readable medium comprising instructions stored thereon, which when executed by the processor configure the second server to perform acts comprising:
   receiving through the receiver a message from the terminal requesting obtainment of the content;
   selecting by the second server a stack to be recommended as a function of a data item relating to the communication network or to the obtainment request message received from the terminal,
   sending through the sender to the terminal a recommendation message comprising the recommended stack, which includes a plurality of communication protocols; and
   receiving through the receiver a message relating to the obtainment of the content, transmitted by the terminal by using the selected recommended stack sent by the second server to the terminal.

11. A first server for redirecting a content obtainment request relating to a data session initiated between a terminal and the first server in a communications network comprising a second server in charge of provision of the content by delegation of the first server, wherein the first server comprises:
- a receiver;
- a sender;
- a processor; and
- a non-transitory computer-readable medium comprising instructions stored thereon, which when executed by the processor configure the first server to perform acts comprising:
  - receiving through the receiver a message requesting the content from the terminal;
  - detecting an incompatibility of a stack used by the terminal with a communication parameter of the second server; and
  - sending through the sender to the terminal a redirection message comprising a plurality of communication protocols and an information item relating to a recommendation of a communication stack.

12. The first server as claimed in claim 11, wherein the device is configured to receive from the terminal a message containing an information item of refusal of the recommended stack received.

13. A terminal requesting provision of a content in a communication network relating to a data session initiated between the terminal and a first content server in the communications network, which includes a second server in charge of provision of the content by delegation of the first content server, wherein the terminal comprises:
- a receiver;
- a sender;
- a processor; and
- a non-transitory computer-readable medium comprising instructions stored thereon, which when executed by the processor configure the terminal to perform acts comprising:
  - sending through the sender to the second server a message requesting obtainment of the content, the message being sent using a communication stack;
  - receiving through the receiver a message sent by the second server of a recommendation indicating to the terminal to change the used communication stack and comprising a recommended stack including a plurality of communication protocols to be used to obtain the content; and
  - sending through the sender to the second server a message of obtainment of the content transmitted using the selected recommended stack sent by the second server.

14. A non-transitory computer-readable recording medium on which a computer program is recorded comprising instructions for implementing a method, when executed by a processor of a second server, of recommending a communication stack, which includes a plurality of communication protocols relating to a data session initiated between a terminal and a first server for provision of a content in a communications network comprising the second server, which is in charge of the provision of the content by delegation of the first server, wherein the instructions configure the second server to perform acts comprising:
- receiving from the terminal a message requesting obtainment of the content;
- selecting by the second server a stack to be recommended as a function of a data item relating to the communication network or to the obtainment request message received from the terminal;
- sending to the terminal a recommendation message comprising the recommended stack, which includes a plurality of communication protocols; and
- receiving a message transmitted by the terminal relating to the obtainment of the content using the selected recommended stack sent by the second server to the terminal.

* * * * *